(12) United States Patent
Takushima et al.

(10) Patent No.: US 6,522,810 B2
(45) Date of Patent: Feb. 18, 2003

(54) OPTICAL LOSS FILTER

(75) Inventors: Michiko Takushima, Yokohama (JP); Shinji Ishikawa, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/983,392

(22) Filed: Oct. 24, 2001

(65) Prior Publication Data

US 2002/0051606 A1 May 2, 2002

(30) Foreign Application Priority Data

Oct. 31, 2000 (JP) .......................................... 2000-332960

(51) Int. Cl.⁷ ................................................. G02B 6/34
(52) U.S. Cl. ............................. 385/37; 385/27; 385/29; 359/130
(58) Field of Search ............................. 385/37, 27, 28, 385/29, 30; 359/130

(56) References Cited

U.S. PATENT DOCUMENTS

| | | | | |
|---|---|---|---|---|
| 5,703,978 A | | 12/1997 | DiGiovanni et al. | |
| 6,021,240 A | * | 2/2000 | Murphy | ........................ 385/37 |
| 6,058,226 A | * | 5/2000 | Starodubov | ................... 385/12 |
| 6,275,628 B1 | * | 8/2001 | Jones | ........................... 385/29 |

* cited by examiner

*Primary Examiner*—Cassandra Spyrou
*Assistant Examiner*—Leo Boutsikaris
(74) *Attorney, Agent, or Firm*—McDermott, Will & Emery

(57) ABSTRACT

The optical loss filter according to the present invention is configured such that a first long-period grating and a second long-period grating are formed in cascade on a unitary optical fiber having a core region and a cladding region. A coating layer surrounding a part of the cladding region is provided between the first and second long-period gratings. The optical loss filter can be made smaller, and can easily realize a desirable loss characteristic.

11 Claims, 10 Drawing Sheets

OPTICAL LOSS FILTER

BACKGROUND OF THE INVENTION

1. Field of the Invention

The present invention relates to an optical loss filter in which a long-period grating is formed on an optical waveguide. As disclosed in U.S. Pat. No. 5,703,978, for example, the long-period grating herein differs from a short-period grating for reflecting light having a predetermined wavelength, and is one which converts, of core-mode light propagating through a core region while being confined there, a predetermined wavelength into cladding-mode light and emits the cladding-mode light out of a cladding region.

2. Related Background Art

An optical waveguide (e.g., optical fiber) in which a refractive index modulation having a period of several hundreds of micrometers (long-period grating) is formed in an optical waveguide region converts, of core-mode light propagating through the optical waveguide while being confined in a core region thereof, a predetermined wavelength into cladding-mode light and emits the cladding-mode light out of a cladding region. Namely, the optical waveguide formed with a long-period grating acts as an optical loss filter having a wavelength selectivity. As can be seen from the loss-generating mechanism mentioned above, this optical loss filter has a characteristic that it yields no reflection, whereby it is favorably used in order to attenuate a predetermined wavelength of core-mode light with no reflection. For example, the optical loss filter is favorably used as a gain equalizer for equalizing the gain of an optical amplifier in wavelength division multiplexing optical communications.

As shown in FIG. 14, an optical loss filter in which a normal long-period grating having a uniform period is formed in a core region of an optical waveguide has the form of a Gaussian like function at a wavelength width of 100 nm, thus yielding only one loss peak. However, the optical loss filter employed as the above-mentioned gain equalizer or the like is required to have a complicated transmission characteristic such as the one shown in FIG. 15. For fulfilling such a requirement, as shown in FIG. 16, a plurality of optical waveguides 83 (three in the drawing) each having excess length parts 82 at both ends of a long-period grating 81 are prepared, the respective excess length parts 82 of adjacent optical waveguides 83 are fusion-spliced to each other while each long-period grating 81 is accommodated in a package 84, and then each of thus fusion-spliced parts 85 is fortified with a reinforcement. The optical loss filter shown in FIG. 16 has such a loss characteristic that the respective loss characteristics of the plurality of long-period gratings are superposed on each other.

SUMMARY OF THE INVENTION

The inventors studied the above-mentioned conventional technique and, as a result, have found a problem as follows. Namely, the optical loss filter, shown in FIG. 16, having a configuration in which excess length parts are fusion-spliced to each other becomes so large that it is hard to be accommodated into a package as a whole.

On the other hand, a plurality of long-period gratings may be formed in cascade on a unitary optical waveguide so as to construct an optical loss filter in order to reduce its size to such an extent that it can be accommodated in a package as a whole. In this case, the optical loss filter as a whole can be made smaller since there is no need to provide excess length parts for fusion splicing. However, the loss characteristic of thus configured optical loss filter differs from one in which the respective loss characteristics of a plurality of long-period gratings formed on a unitary optical waveguide are superposed on each other, thus failing to become the desirable one.

In order to overcome the problems mentioned above, it is an object of the present invention to provide an optical loss filter which can reduce its size and can easily realize a desirable loss characteristic.

The optical loss filter according to the present invention comprises a plurality of long-period gratings formed in cascade on a unitary optical waveguide having a core region and a cladding region, wherein cladding-mode light emitting means for emitting cladding-mode light to the outside is provided between two adjacent long-period gratings in the plurality of long-period gratings. In the optical loss filter, the cladding-mode light converted from the core-mode light in a long-period grating is emitted to the outside by the cladding-mode light emitting means, whereby the ratio at which it returns to the core-mode light is lower in the other long-period gratings. Therefore, the loss characteristic of the optical loss filter is one in which the respective loss characteristics of the plurality of long-period gratings are superposed on each other.

In the optical loss filter according to the present invention, the cladding-mode light emitting means can be a coating layer surrounding the cladding region at a part between the two adjacent long-period gratings. In this case, the cladding-mode light converted from the core-mode light in a long-period grating is emitted to the outside by way of the coating layer acting as the cladding-mode light emitting means. The coating layer is preferably a resin. The refractive index of the coating layer is preferably at least 1.25 but not exceeding 1.65, more preferably at least 1.35 but not exceeding 1.55, in a wavelength band in use. If the optical waveguides are made of a silica type material in this case, the refractive index of the coating layer and the refractive index of the cladding region will attain respective values relatively close to each other, whereby the cladding-mode light will be emitted to the outside efficiently. Preferably, the coating layer has a transmittance of at least −10 dB/mm in the wavelength band in use. In this case, transmission characteristics are less likely to be adversely affected by the heating caused by the radiation light absorption in the coating layer.

In the optical loss filter according to the present invention, the cladding-mode light emitting means can be an outer shape changing portion of the cladding region between the two adjacent long-period gratings. In this case, the cladding-mode light converted from the core-mode light in a long-period grating is emitted to the outside at the outer shape changing portion of the cladding region, which is the cladding-mode light emitting means. The outer shape changing portion can be formed either by chemical etching or by melting upon heating.

Preferably, in the optical loss filter according to the present invention, the plurality of long-period gratings in total are formed within the range of 60 mm or less. This configuration is preferable when accommodating the whole optical loss filter into a single package.

Preferably, in the optical loss filter according to the present invention, the cladding-mode emitting means and each of the two adjacent long-period gratings have a distance of at least 1 mm therebetween. Though a desirable loss characteristic can not be obtained if the distance between the coating layer and each of the long-period gratings is on the order of the refractive index modulation period of each long-period grating, the desirable loss characteristic can be obtained if this distance is at least 1 mm.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1A:
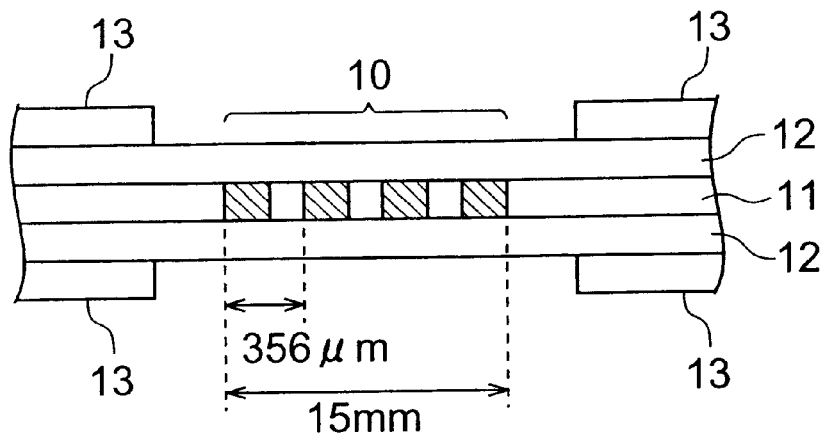
FIG. 1A is a view showing the configuration of a first long-period grating.
Figure 1B:
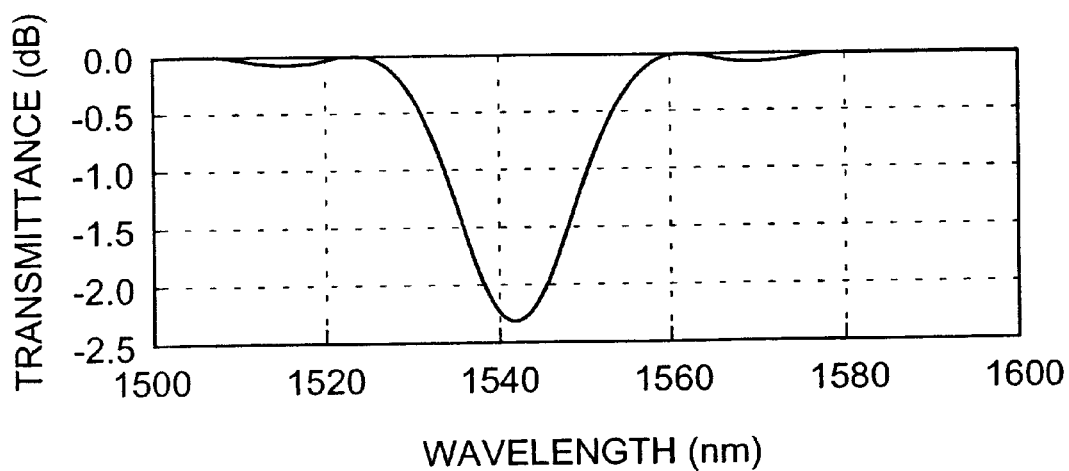
FIG. 1B is a graph showing the transmission characteristic of the first long-period grating.
Figure 2A:
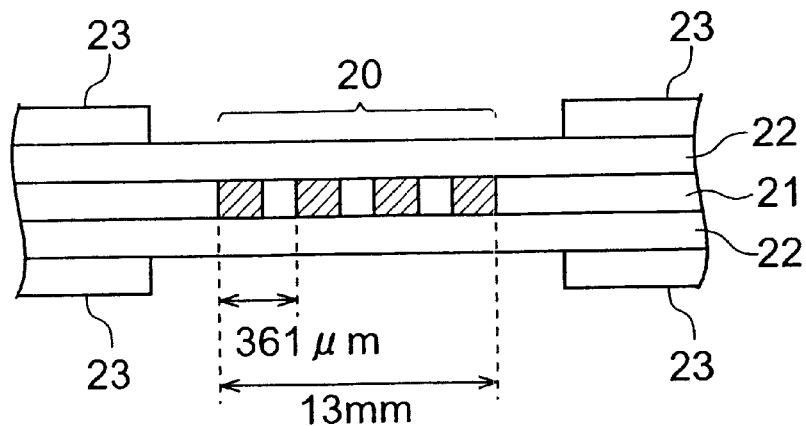
FIG. 2A is a view showing the configuration of a second long-period grating.
Figure 2B:
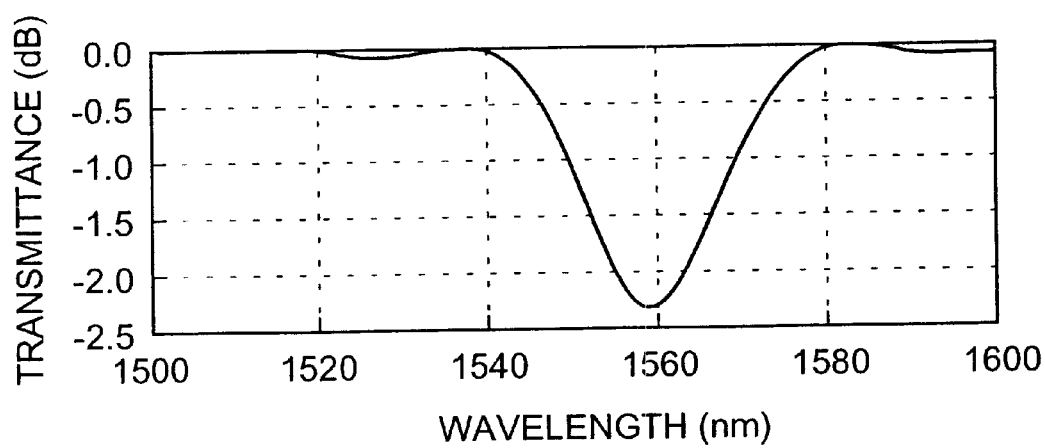
FIG. 2B is a graph showing the transmission characteristic of the second long-period grating.

FIG. 1A is a view showing the configuration of a first long-period grating 10, whereas FIG. 1B is a graph showing the transmission characteristic of the first long-period grating 10. FIG. 2A is a view showing the configuration of a second long-period grating 20, whereas FIG. 2B is a graph showing the transmission characteristic of the second long-period grating 20.

As shown in FIG. 1A, the first long-period grating 10 is a silica type optical fiber having a core region 11 and a cladding region 12, in which the core region 11 is formed with a grating having a period of 356 $\mu$m and a length of 15 mm. The optical fiber is in an exposed state in the area formed with the grating, whereas the outer periphery of the cladding region 12 is covered with a coating layer 13 in the area not formed with the grating. As shown in FIG. 1B, the first long-period grating 10 has a transmission characteristic having a loss peak near a wavelength of 1542 nm. This loss peak is formed by the coupling between the core-mode light and the sixth-order cladding-mode light.

Similarly, as shown in FIG. 2A, the second long-period grating 20 is a silica type optical fiber having a core region 21 and a cladding region 22, in which the core region 21 is formed with a grating having a period of 361 $\mu$m and a length of 13 mm. The optical fiber is in an exposed state in the area formed with the grating, whereas the outer periphery of the cladding region 22 is covered with a coating layer 23 in the area not formed with the grating. As shown in FIG. 2B, the second long-period grating 20 has a transmission characteristic having a loss peak near a wavelength of 1558 nm. This loss peak is formed by the coupling between the core-mode light and the sixth-order cladding-mode light.

Figure 3:
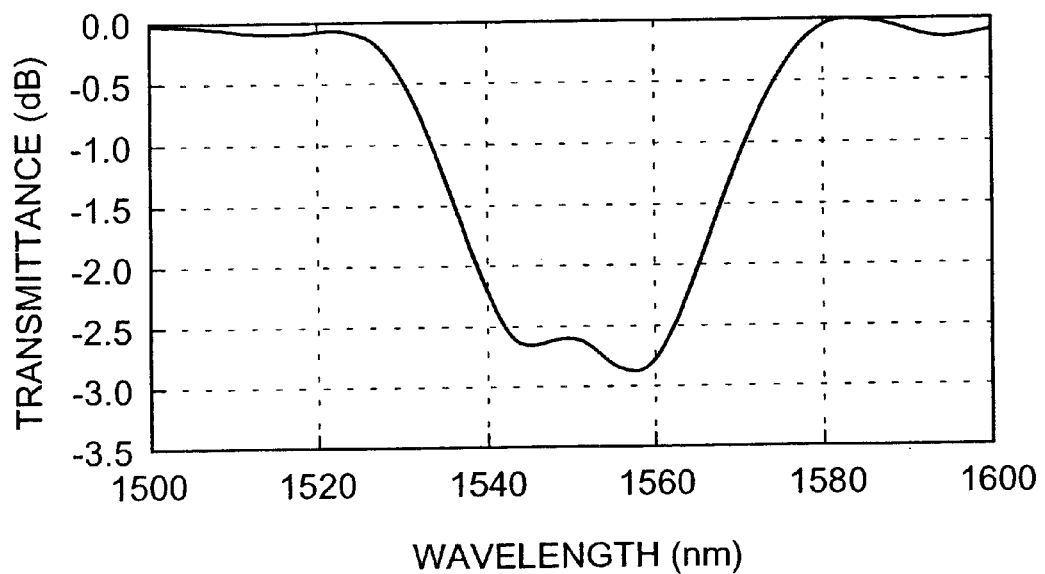
FIG. 3 is a graph showing the total transmission characteristic obtained when respective excess length parts of the first and second long-period gratings are fusion-spliced together.

FIG. 3 is a graph showing the total transmission characteristic obtained when respective excess length parts of the first long-period grating 10 and second long-period grating 20 are fusion-spliced to each other. As can be seen from this graph, the total loss characteristic obtained upon fusion-splicing is one in which the respective loss characteristics of the two long-period gratings 10, 20 are superposed together, thereby yielding respective loss peaks near a wavelength of 1542 nm and near a wavelength of 1558 nm.

Figure 4:
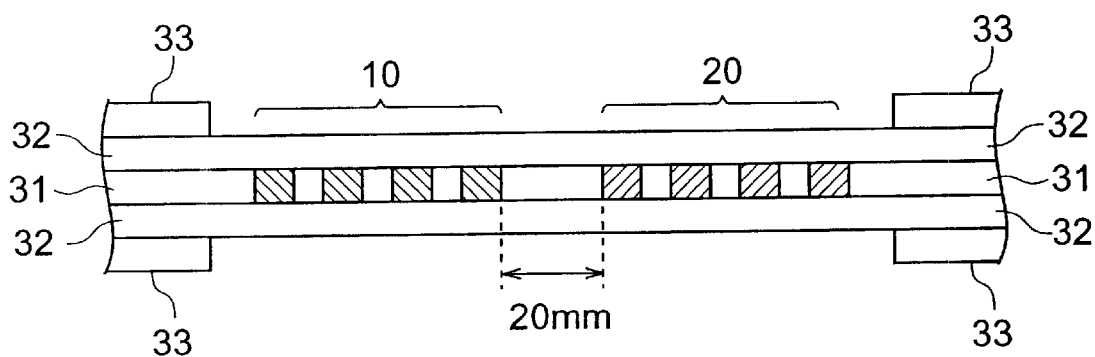
FIG. 4 is a view showing the configuration of an optical loss filter in which the first and second long-period gratings are formed in a unitary optical fiber.
Figure 5:
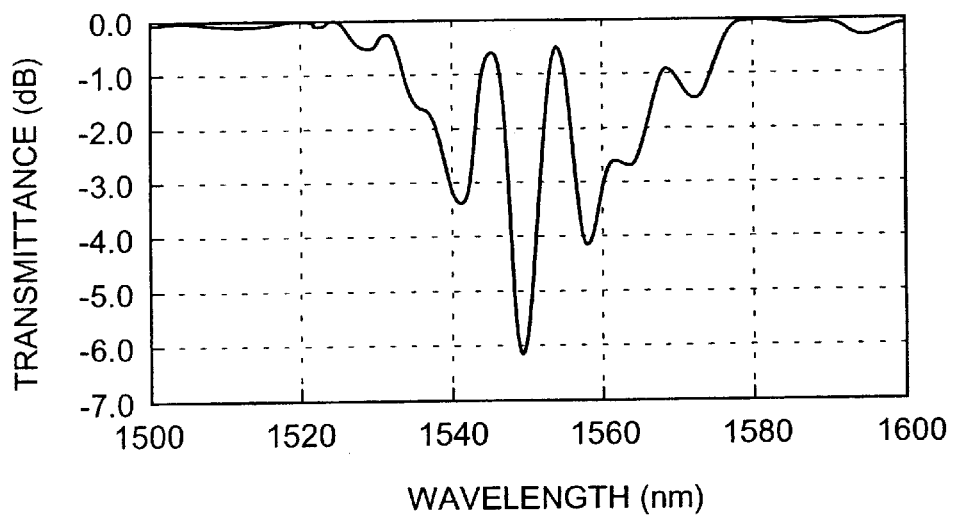
FIG. 5 is a graph showing the transmission characteristic of the optical loss filter in which the first and second long-period gratings are formed in the unitary optical fiber.

FIG. 4 is a view showing the configuration of an optical loss filter in which the first long-period grating 10 and the second long-period grating 20 are formed in a unitary optical fiber, whereas FIG. 5 is a view showing the total transmission characteristic of this optical loss filter. In a silica type optical fiber, doped with GeO$_2$, having a core region 31 and a cladding region 32, the core region 31 is irradiated with ultraviolet light (e.g., laser light having a wavelength of 248 nm outputted from a KrF excimer laser light source) subjected to spatial intensity modulation, so as to form the first long-period grating 10 and the second long-period grating 20 in the loss filter. The distance between the first long-period grating 10 and the second long-period grating 20 is 20 mm. The optical fiber is in an exposed state in the regions formed with the first long-period grating 10 and second long-period grating 20, whereas the cladding region 32 is covered with a coating layer 33 in the other areas. When the first long-period grating 10 and the second long-period grating 20 are formed in a unitary optical fiber, as can be seen from FIG. 5, the total loss characteristic differs from the one in which the respective loss characteristics of the two long-period gratings 10, 20 are superposed on each other, and has a loss peak in the vicinity of 1548 nm.

Figure 6:
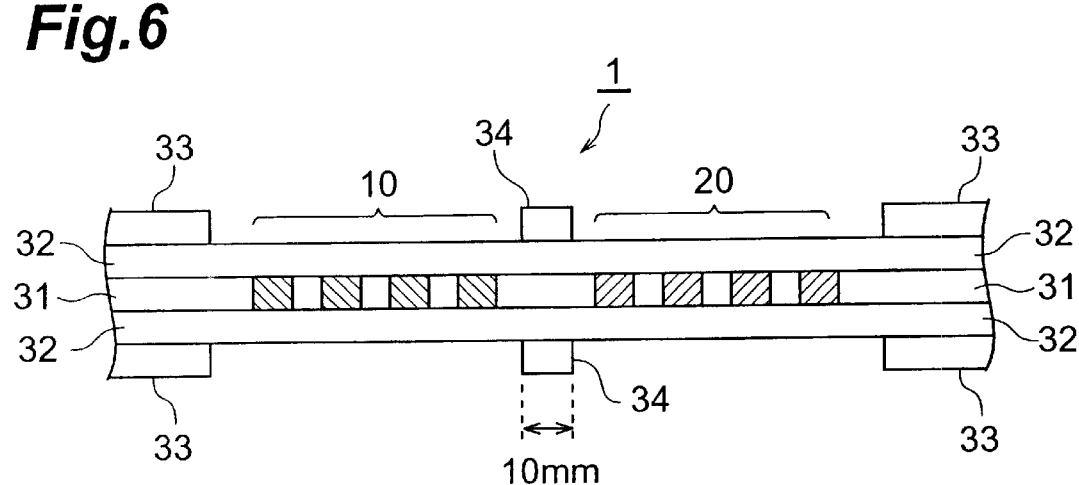
FIG. 6 is a view showing the configuration of the optical loss filter according to a first embodiment.
Figure 7:
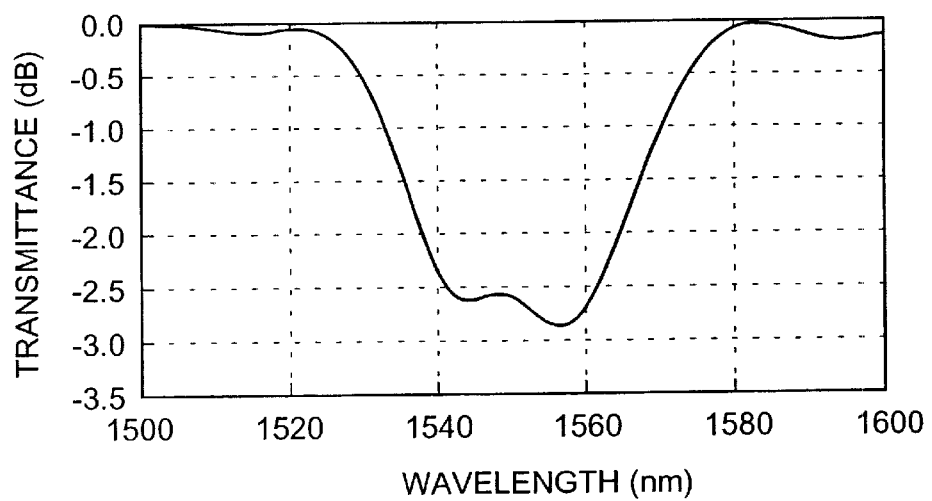
FIG. 7 is a graph showing the transmission characteristic of the optical loss filter according to the first embodiment.

FIG. 6 is a view showing the configuration of an optical loss filter 1 according to a first embodiment, whereas FIG. 7 is a graph showing the total transmission characteristic of the optical loss filter 1. The optical loss filter 1 is the same as that shown in FIG. 4 except that a coating layer 34 surrounding the cladding region 32 is additionally provided at a part extending by 10 mm in the 20-mm gap between the first long-period grating 10 and the second long-period grating 20. The coating layer 34 is a UV-curable resin having a refractive index of 1.4. As can be seen from FIG. 7, the total loss characteristic of the optical loss filter 1 provided with the coating layer 34 is one in which the respective loss characteristics of the two long-period gratings 10, 20 are superposed on each other, as in the characteristic (FIG. 3) obtained upon fusion-splicing, thereby exhibiting respective loss peaks near a wavelength of 1542 nm and near a wavelength of 1558 nm.

Figure 8A:
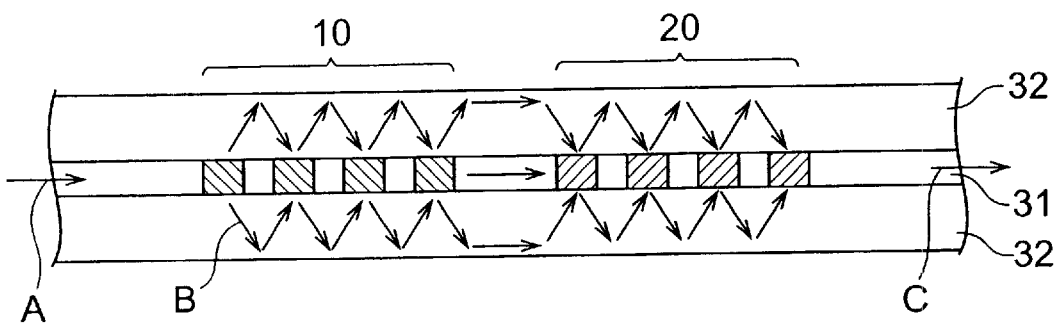
FIGS. 8A and 8B are views for explaining the coupling of core-mode light and cladding-mode light in the optical loss filter.
Figure 8B:
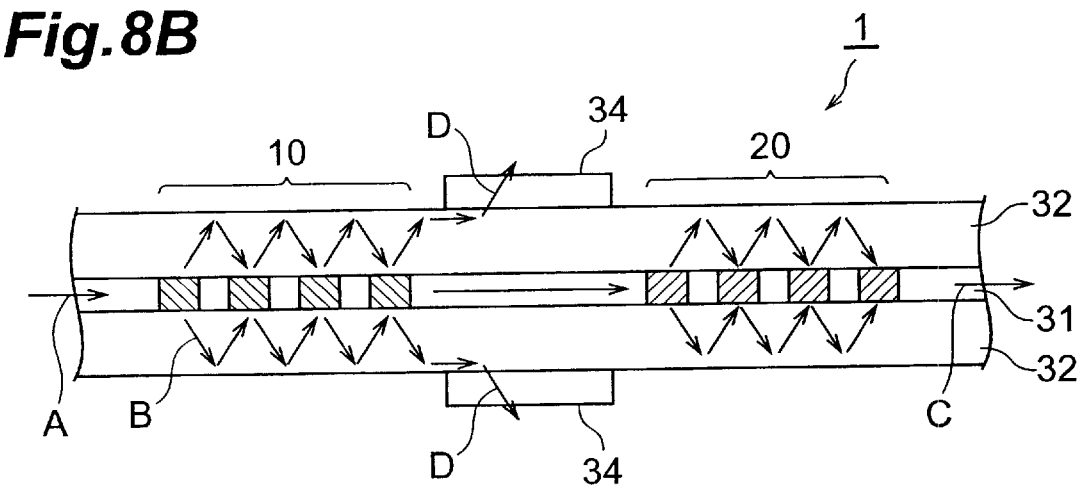

As in the foregoing, while the total loss characteristic obtained without the coating layer 34 differs from one in which the respective loss characteristics of the two long-period gratings 10, 20 are superposed on each other as shown in FIGS. 4 and 5, the total loss characteristic obtained when provided with the coating layer 34 becomes one in which the respective loss characteristics of the two long-period gratings 10, 20 are superposed on each other as shown in FIGS. 6 and 7. The following is presumed to be a reason therefor. FIGS. 8A and 8B are views for explaining the coupling between core-mode light and cladding-mode light in optical loss filters.

When no coating layer 34 is provided, as shown in FIG. 8A, a specific wavelength of propagating core-mode light A is converted into sixth-order cladding-mode light B in the first long-period grating 10. However, a part of the sixth-order cladding-mode light B returns to core-mode light C in the second long-period grating 20. Therefore, it is presumed that the total loss characteristic differs from one in which the respective loss characteristics of the two long-period gratings 10, 20 are superposed on each other.

In the case where the coating layer 34 is provided between the first long-period grating 10 and the second long-period grating 20 as shown in FIG. 8B, a specific wavelength of the propagating core-mode light A is converted into the sixth-order cladding-mode light B in the first long-period grating 10. When the cladding-mode light B reaches the part covered with the coating layer 34, it is emitted to the outside as radiation light D, whereby the ratio at which it returns to the core-mode light C in the second long-period grating 20 becomes quite low. Therefore, the total loss characteristic is presumed to become one in which the respective loss characteristics of the two long-period gratings 10, 20 are superposed on each other.

As in the foregoing, the optical loss filter according to the first embodiment shown in FIG. 6 is one in which the coating layer 34 as cladding-mode light emitting means for emitting the cladding-mode light to the outside is provided between the first long-period grating 10 and second long-period grating 20 formed in cascade on a unitary optical fiber. As a consequence of such a configuration, the loss characteristic of the optical loss filter 1 can easily be predicted from the respective loss characteristics of the first long-period grating 10 and second long-period grating 20, whereby a desirable loss characteristic can be realized easily.

Preferably, the refractive index of the coating layer 34 in the wavelength band in use is as close as possible to the value of refractive index of the cladding region 32, i.e., 1.45, from the viewpoint of emitting the cladding-mode light to the outside. If the refractive index of the coating layer 34 is at least 1.25 but not exceeding 1.65 in the wavelength band in use, the cladding-mode light will be reduced to 1% or less when the width of the coating layer 34 is 3 mm. If the refractive index of the coating layer 34 is at least 1.35 but not exceeding 1.55 in the wavelength band in use, the cladding-mode light will be reduced to 0.1% or less when the width of the coating layer 34 is 3 mm. Since the transmission characteristic is adversely affected when the coating layer 34 generates heat upon absorbing the radiation light, the coating layer 34 preferably has a transmittance of at least −10 dB/mm in the wavelength band in use.

Since the transmission characteristic of a long-period grating greatly changes upon bending, the transmission characteristic mentioned in the foregoing is one measured while a tension of 50 g is applied to the optical loss filter. Not only for applying a predetermined tension as such but also for making the handling easier, the optical loss filter is preferably accommodated in a single package. Since a plurality of long-period gratings are formed in cascade in a unitary optical fiber without being fusion-spliced at excess length parts thereof, the optical loss filter 1 according to this embodiment can be made smaller so as to be accommodated in a single package as a whole. For accommodating the whole optical loss filter 1 in a single package, it is preferred that the first long-period grating 10 and second long-period grating 20 be formed within the range of 60 mm or less. However, the distance between the coating layer 34 and each of the long-period gratings 10, 20 is preferably at least 1 mm, since a desirable loss characteristic may not be obtained if the distance is on the order of the refractive index modulation period of each of them.

Figure 9:
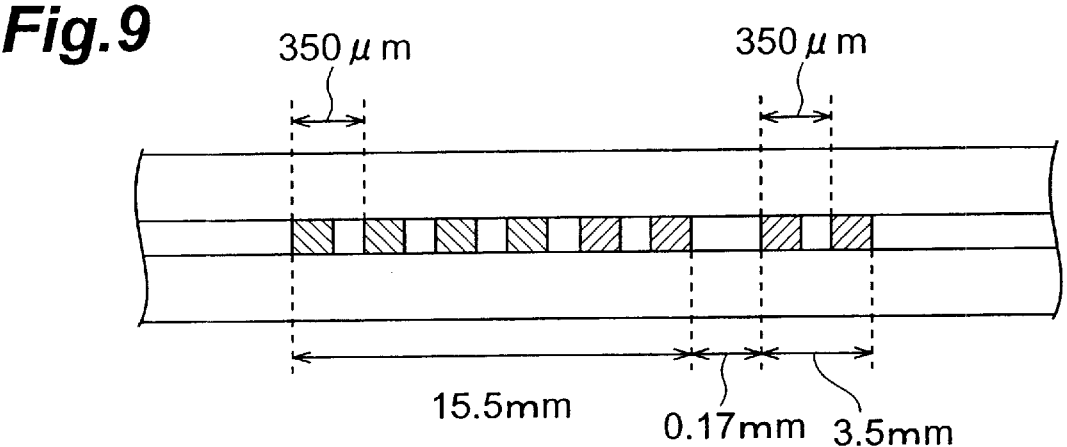
FIG. 9 is a view showing the configuration of a long-period grating having a phase shift part.

Next, assuming the first long-period grating to be normal one having a uniform structure with no phase shift part, and the second long-period grating to be one having a phase shift part, the effect of a coating layer as the cladding-mode light emitting means for emitting the cladding-mode light to the outside was verified. The first long-period grating has a period of 347 μm and a forming area length of 32 mm. As shown in FIG. 9, the second long-period grating has a period of 350 μm, while a phase shift part having a length of 0.17 mm is provided between a uniform forming area length of 15.5 mm and a uniform forming area length of 3.5 mm.

Figure 10:
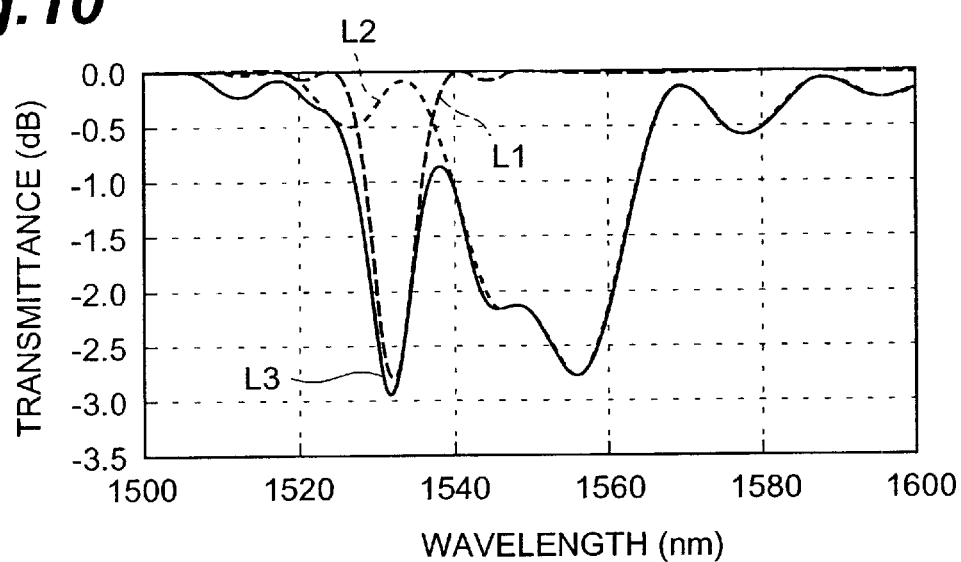
FIG. 10 is a graph showing the loss characteristic of the first long-period grating, the loss characteristic of the second long-period grating having a phase shift part, and the total loss characteristic obtained when both of the gratings are fusion-spliced to each other.
Figure 11:
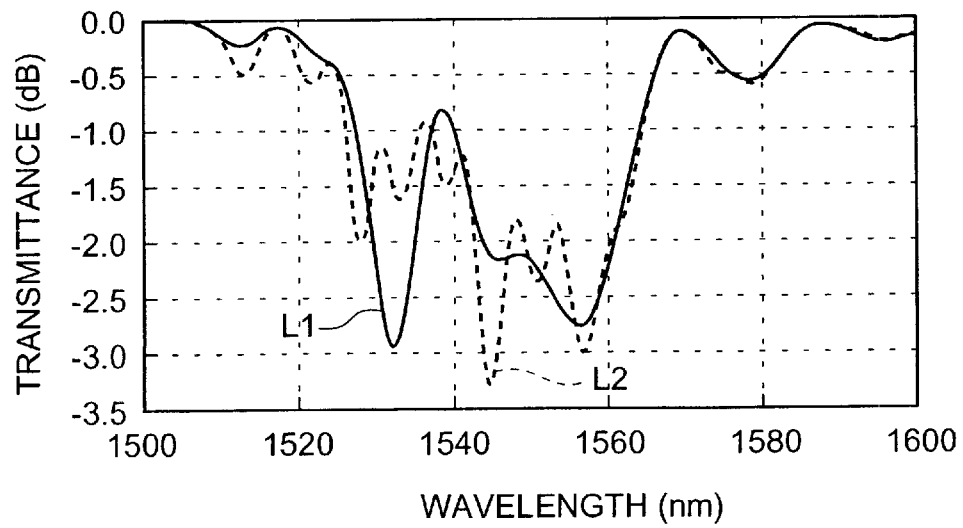
FIG. 11 is a graph showing the total loss characteristic obtained when the first and second long-period gratings are formed in cascade in a unitary optical fiber while a coating layer is provided between the first and second long-period gratings, and the total loss characteristic obtained when no coating layer is disposed therebetween.

FIG. 10 is a graph showing the loss characteristic L1 of the first long-period grating, the loss characteristic L2 of the second long-period grating having the phase shift part, and the total loss characteristic L3 obtained when the first and second long-period gratings are fusion-spliced to each other. FIG. 11 is a graph showing the total loss characteristic L1 obtained when the first and second long-period gratings are formed in cascade in a unitary optical fiber while a coating layer is provided between the first and second long-period gratings, and the total loss characteristic L2 obtained when no coating layer is provided therebetween. As can be seen from these graphs, the total loss characteristic obtained when the first and second long-period gratings are formed in cascade in a unitary optical fiber while a coating layer is provided between the first and second long-period gratings is similar to the total loss characteristic obtained when the first and second long-period gratings are fusion-spliced to each other, in which the respective loss characteristics of the two long-period gratings are superposed on each other.

Figure 12:
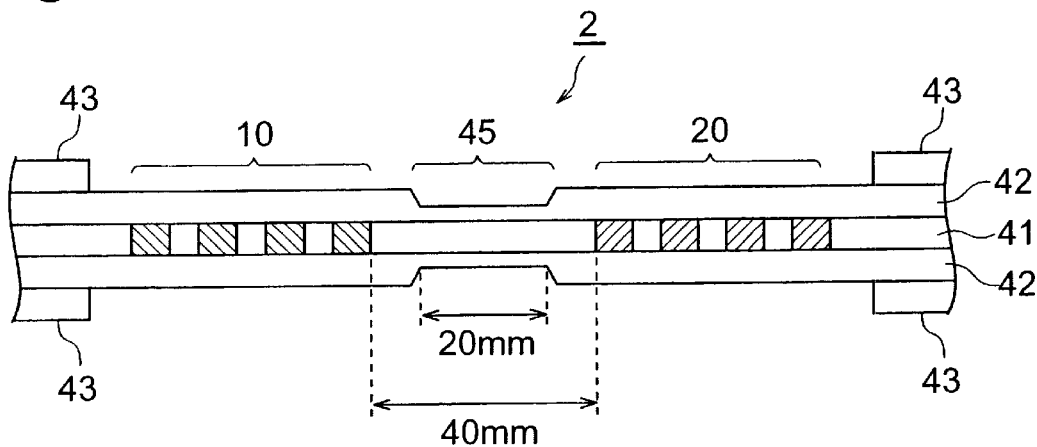
FIG. 12 is a view showing the configuration of the optical loss filter according to a second embodiment.

A second embodiment will now be explained. FIG. 12 is a view showing the configuration of an optical loss filter 2 according to the second embodiment. In the optical loss filter 2 according to this embodiment, long-period gratings 10, 20 are formed in cascade on a unitary optical fiber having a core region 41 and a cladding region 42. The distance between the first long-period grating 10 and the second long-period grating 20 is 40 mm. The optical fiber is in an exposed state in the areas formed with the first long-period grating 10 and second long-period grating 20, whereas the cladding region 42 is covered with a coating layer 43 in the other areas. The part extending by 20 mm in the 40-mm gap between the first long-period grating 10 and second long-period grating 20 is formed with an outer shape changing portion 45 of the cladding region 42 as the cladding-mode light emitting means for emitting the cladding-mode light to the outside. The outer shape changing portion 45 is formed by chemical etching as being immersed in an aqueous hydrofluoric acid solution for 5 minutes. While the cladding region 42 has an outer diameter of 125 μm at the normal portion, the outer shape changing portion 45 has an outer diameter of 60 μm, for example.

In this embodiment, a specific wavelength of the propagating core-mode light is converted into cladding-mode light in the first long-period grating 10, and thus obtained cladding-mode light is emitted as radiation light to the outside upon reaching the outer shape changing portion 45, whereby the ratio at which it returns to the core-mode light in the second long-period grating is quite low. Therefore, the total loss characteristic of the optical loss filter 2 becomes one in which the respective loss characteristics of the two long-period gratings 10, 20 are superposed on each other.

Figure 13:
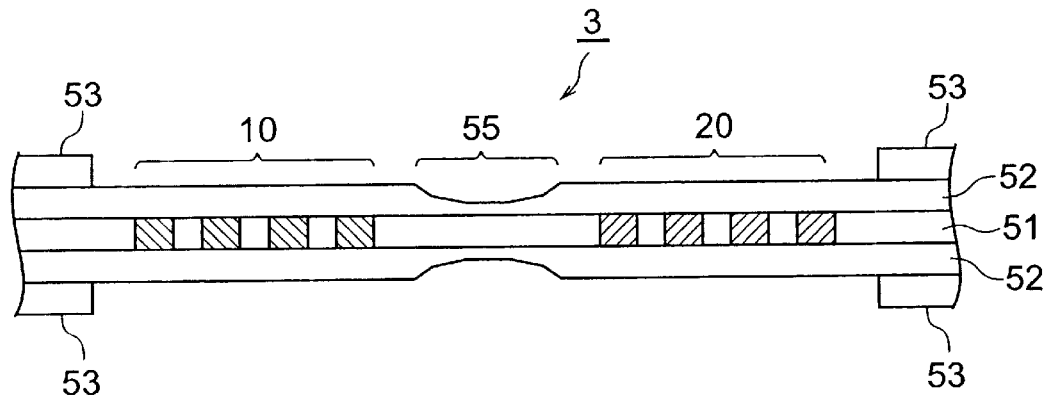
FIG. 13 is a view showing the configuration of the optical loss filter according to a third embodiment.
Figure 14:
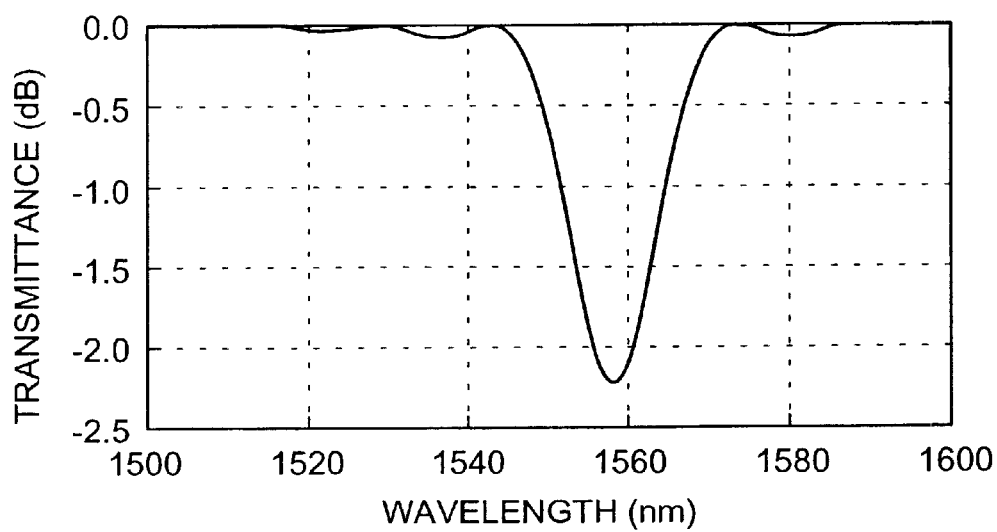
FIG. 14 is a graph showing the transmission characteristic of an optical loss filter in which a core region of an optical waveguide is formed with a normal long-period grating having a uniform period.
Figure 15:
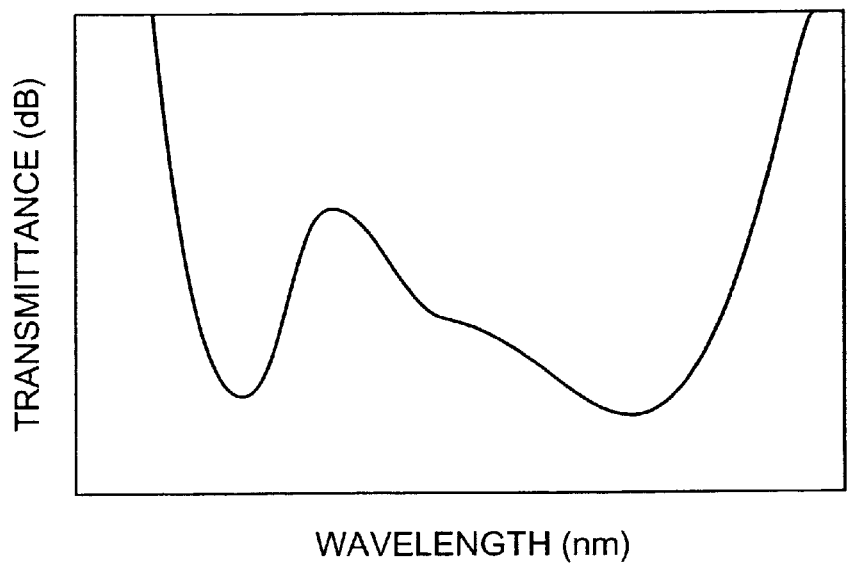
FIG. 15 is a graph showing a transmission characteristic required for an optical loss filter employed as a gain equalizer.
Figure 16:
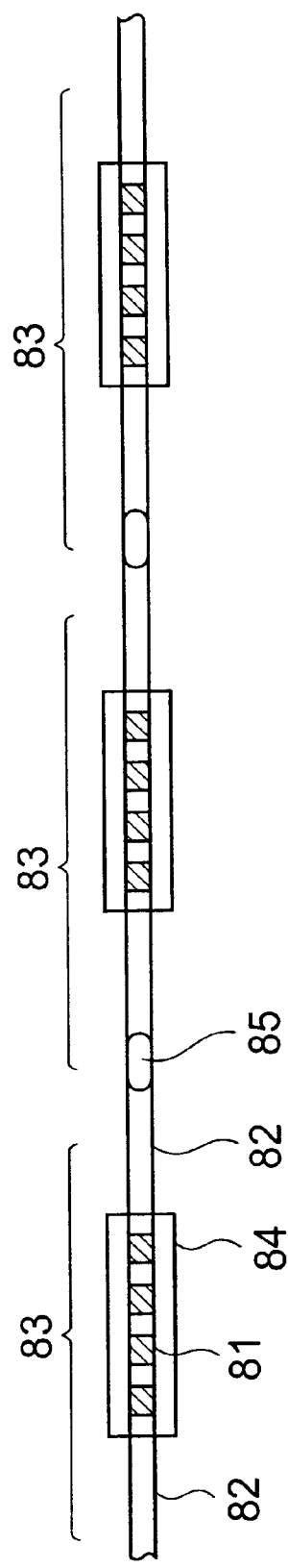
FIG. 16 is a view showing the configuration of an optical loss filter formed by fusion-splicing respective excess length parts of a plurality of optical waveguides, each including a long-period grating, to each other.

A third embodiment will now be explained. FIG. 13 is a view showing the configuration of an optical loss filter 3 according to the third embodiment. In the optical loss filter 3 according to this embodiment, long-period gratings 10, 20 are formed in cascade on a unitary optical fiber having a core region 51 and a cladding region 52. The distance between the first long-period grating 10 and the second long-period grating 20 is 20 mm. The optical fiber is in an exposed state in the areas formed with the first long-period grating 10 and second long-period grating 20, whereas the cladding region 52 is covered with a coating layer 53 in the other areas. The part extending by 10 mm in the 20-mm gap between the first long-period grating 10 and second long-period grating 20 is formed with an outer shape changing portion 55 of the cladding region 52 as the cladding-mode light emitting means for emitting the cladding-mode light to the outside. The outer shape changing portion 55 is formed by heating the optical fiber with a flame from a gas burner so as to extend it upon melting. While the cladding region 52 has an outer diameter of 125 μm at the normal portion, the outer shape changing portion 55 has an outer diameter of 60 μm, for example. This embodiment operates in such a manner as with the second embodiment. The optical fiber may be pushed in instead of being extended, so as to make the outer diameter of the outer shape changing means greater than that of the cladding region 52 at the normal portion.

Without being restricted to the above-mentioned embodiments, the present invention can be modified in various manners. For example, though a unitary optical waveguide (optical fiber) is formed with two long-period gratings in cascade in the above-mentioned embodiments, N (N≧3) long-period gratings may be formed in cascade on a unitary optical waveguide. In this case, the cladding-mode light emitting means is provided between the n-th long-period grating and the (n+1)-th long-period grating (1≦n<N), which are adjacent each other.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical loss filter comprising a plurality of long-period gratings formed in cascade on a unitary optical waveguide having a core region and a cladding region, wherein cladding-mode light emitting means for emitting cladding-mode light to the outside is provided between two adjacent long-period gratings in said plurality of long-period gratings.

2. An optical loss filter according to claim 1, wherein said cladding-mode light emitting means is a coating layer surrounding said cladding region at a part between said two adjacent long-period gratings.

3. An optical loss filter according to claim 2, wherein said coating layer is a resin.

4. An optical loss filter according to claim 2, wherein said coating layer has a refractive index of at least 1.25 but not exceeding 1.65 in a wavelength band in use.

5. An optical loss filter according to claim 2, wherein said coating layer has a refractive index of at least 1.35 but not exceeding 1.55 in a wavelength band in use.

6. An optical loss filter according to claim 2, wherein said coating layer has a transmittance of at least −10 dB/mm in a wavelength band in use.

7. An optical loss filter according to claim 1, wherein said cladding-mode light emitting means is an outer shape changing portion of said cladding region between said two adjacent long-period gratings.

8. An optical loss filter according to claim 7, wherein said outer shape changing portion is formed by chemical etching.

9. An optical loss filter according to claim 7, wherein said outer shape changing portion is formed by melting upon heating.

10. An optical loss filter according to claim 1, wherein said plurality of long-period gratings in total are formed within the range of 60 mm or less.

11. An optical loss filter according to claim 1, wherein said cladding-mode light emitting means and each of said two adjacent long-period gratings have a distance of 1 mm or greater therebetween.

* * * * *